United States Patent
Sanders et al.

(10) Patent No.: US 8,328,075 B2
(45) Date of Patent: Dec. 11, 2012

(54) METHODS OF MARK-OFF SUPPRESSION IN SUPERPLASTIC FORMING AND DIFFUSION BONDING

(75) Inventors: Daniel G. Sanders, Sumner, WA (US); Larry D. Hefti, Auburn, WA (US); Gregory L. Ramsey, Seabeck, WA (US)

(73) Assignee: The Boeing Company, Chicago, IL (US)

( * ) Notice: Subject to any disclaimer, the term of this patent is extended or adjusted under 35 U.S.C. 154(b) by 205 days.

(21) Appl. No.: 11/393,114

(22) Filed: Mar. 30, 2006

(65) Prior Publication Data

US 2007/0228114 A1    Oct. 4, 2007

(51) Int. Cl.
B23K 20/00 (2006.01)
B23K 28/00 (2006.01)
B21D 31/04 (2006.01)

(52) U.S. Cl. ............ 228/193; 228/157; 228/194; 72/60; 72/61; 29/421.1; 29/505

(58) Field of Classification Search .................. 228/193, 228/157, 194; 72/60, 61; 29/421.1, 505
See application file for complete search history.

(56) References Cited

U.S. PATENT DOCUMENTS

| | | | |
|---|---|---|---|
| 3,807,032 A | 4/1974 | Nilsson | |
| 3,927,817 A * | 12/1975 | Hamilton et al. | 228/157 |
| 4,304,350 A | 12/1981 | Paez et al. | |
| 4,331,284 A | 5/1982 | Schulz et al. | |
| 4,426,032 A | 1/1984 | Leodolter | |
| 4,534,196 A | 8/1985 | Kiyoto et al. | |
| 4,603,808 A | 8/1986 | Stacher | |
| 5,115,963 A * | 5/1992 | Yasui | 228/157 |
| 5,214,948 A * | 6/1993 | Sanders et al. | 72/58 |
| 5,240,376 A * | 8/1993 | Velicki | 416/229 A |
| 5,275,325 A | 1/1994 | Stracquadaini | |
| 5,284,288 A * | 2/1994 | Woodward | 228/157 |
| 5,384,959 A * | 1/1995 | Velicki | 29/889.72 |
| 5,401,583 A | 3/1995 | Stacher et al. | |
| 5,692,406 A | 12/1997 | Yasui | |
| 5,890,285 A * | 4/1999 | Pruitt et al. | 29/889.72 |
| 6,138,898 A * | 10/2000 | Will et al. | 228/157 |
| 6,264,880 B1 | 7/2001 | Elmer et al. | |
| 6,419,146 B1 * | 7/2002 | Buldhaupt et al. | 228/193 |
| 6,677,011 B2 | 1/2004 | Elmer et al. | |
| 2006/0005594 A1 * | 1/2006 | Franchet et al. | 72/61 |
| 2006/0210821 A1 * | 9/2006 | Eilert et al. | 428/543 |
| 2007/0102494 A1 * | 5/2007 | Connelly et al. | 228/157 |

FOREIGN PATENT DOCUMENTS

EP    00194827 B1    5/1989

* cited by examiner

*Primary Examiner* — Devang R Patel

(57) ABSTRACT

The invention provides methods of superplastic forming and diffusion bonding and a gas inlet tube that facilitates the methods which produce structures that are substantially mark off free. Methods include disposing a sealed pack into a die having a patterned surface and an opposite surface; applying a first pressure within the die around an outside of the pack; applying a second pressure within the pack, the second pressure exceeding the first pressure; and forming the pack by superplastic deformation into a diffusion-bonded structure. Further, a gas inlet tube is provided having an inner tube and an outer tube, where the outer tube is weldable to the pack in a gas tight seal.

7 Claims, 4 Drawing Sheets

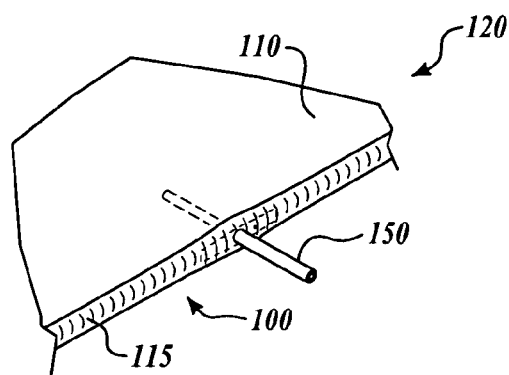
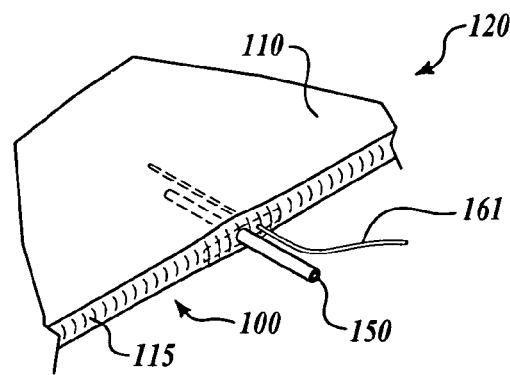
FIG.5A    FIG.5B
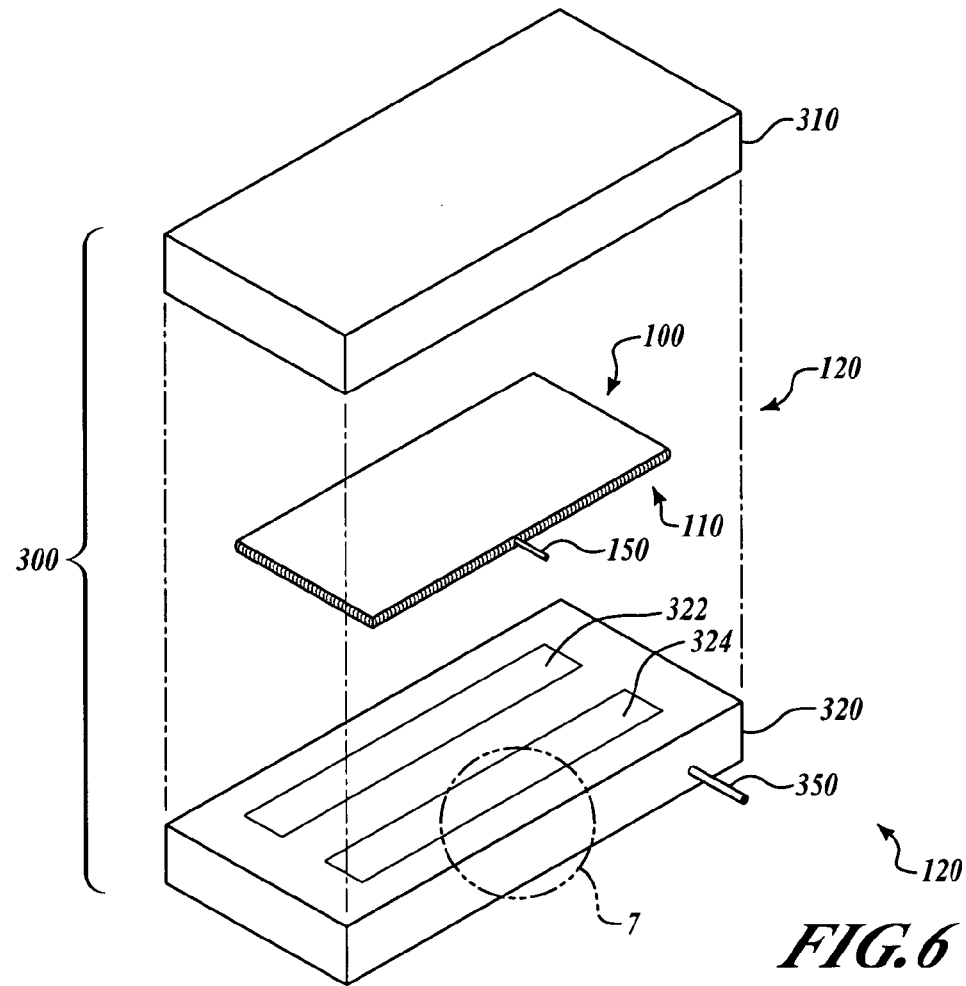
FIG.6

METHODS OF MARK-OFF SUPPRESSION IN SUPERPLASTIC FORMING AND DIFFUSION BONDING

RELATED APPLICATIONS

None

FEDERAL GRANT FUNDING

None

BACKGROUND OF THE INVENTION

1. Field of the Invention

The invention relates to the forming of metal under applied pressure and heat in dies and more particularly to superplastic forming of metal sheets in forming dies.

2. Description of the Related Art

In the manufacture of complex metal shapes from sheet metal, it is common to utilize die that have internal surfaces patterned in accordance with the desired shape to be imparted to the sheet metal. Certain metals, under applied heat and pressure, have superplastic properties that allow the metal to be deep drawn for forming into complex shapes. Sheets of these metals also diffusion bond to adjacent sheets under applied heat and pressure in the die through commingling of atoms of one sheet with the other resulting in a unitary structure.

Several techniques are used in superplastic forming and diffusion bonding. For example, to prevent "sticking" or bonding of metal sheets to a die surface, certain chemical release agents may be applied such as Yttrium Oxide. When sheets are stacked into a pack for superplastic forming and diffusion bonding into a stiffened structure, it is common to weld several gas inlet tubes between sheets of the pack.

One of the limitations of the superplastic forming technology is the tendency for the formed structure to suffer from "surface mark-off." Surface mark-off is a marring (often in the form of a crease) of the surface of the formed metal structure. Typically mark offs appear on an opposite side to the patterned side. For example, when the forming process requires a deep draw on the metal when a stiffener is being formed, the mark off appears as crease on the other side of the stiffener. There is a need to develop a superplastic die forming method and/or apparatus that reduces or eliminates mark-off.

SUMMARY OF THE INVENTION

The invention provides methods of superplastic forming in a metal forming die that reduce or eliminate mark off of the product. In addition, it provides a gas inlet tube that facilitates practicing the methods of the invention.

An embodiment of the methods of the invention includes disposing a sealed pack into a forming die for superplastic forming and diffusion bonding. The die has a patterned surface and an opposite surface. A first pressure is applied within the die around an outside of the pack; and a second pressure, higher than the first pressure, is applied within the pack during forming of the pack by superplastic deformation into a diffusion-bonded structure.

The appropriate selection of first and second pressures in accordance with the invention results in a formed structure substantially free of mark off blemishes. In one embodiment, the first pressure may be in the range from about 100 to about 300 psi at the operating temperature. The differential between the first and the second pressures may be in the range from about 100 to about 500 psi. The applying of the second pressure may be via a gas inlet tube.

In one aspect of the invention, the gas inlet tube may include an inner tube of a material substantially impervious to die forming conditions and an outer tube of material that is weldable to the sheets. Further, the gas inlet tube includes wings extending on opposite sides of the gas inlet tube that facilitate sealing the tube to the pack edges. The die surface may have a receiving cavity shaped to receive the gas inlet tube during forming. The receiving cavity may have a laterally extending funnel-shape with the funnel mouth inboard, and the cylindrical trough extending from the apex of the funnel shape to an outer edge of the die. The outer tube of the gas inlet tube may be of the same material as the pack.

BRIEF DESCRIPTION OF THE DRAWINGS

A more complete understanding of the present invention may be derived by referring to the detailed description and claims when considered in conjunction with the following figures, which are schematic, not to scale and intended for illustrative purposes. Like reference numbers refer to similar elements throughout the figures.

FIG. 5A is a schematic perspective view of a portion of an example of a pack showing a gas inlet tube welded in place, in accordance with an embodiment of the invention;

FIG. 5B is a schematic perspective view of a portion of an example of a pack showing a gas inlet tube welded in place with a temporary inert gas purge tube in place, in accordance with an embodiment of the invention FIG. 6 is a schematic depicting a metal forming die with pack inserted between die halves for forming in accordance with an embodiment of the invention;

DETAILED DESCRIPTION OF THE PREFERRED EMBODIMENTS

Figure 1:
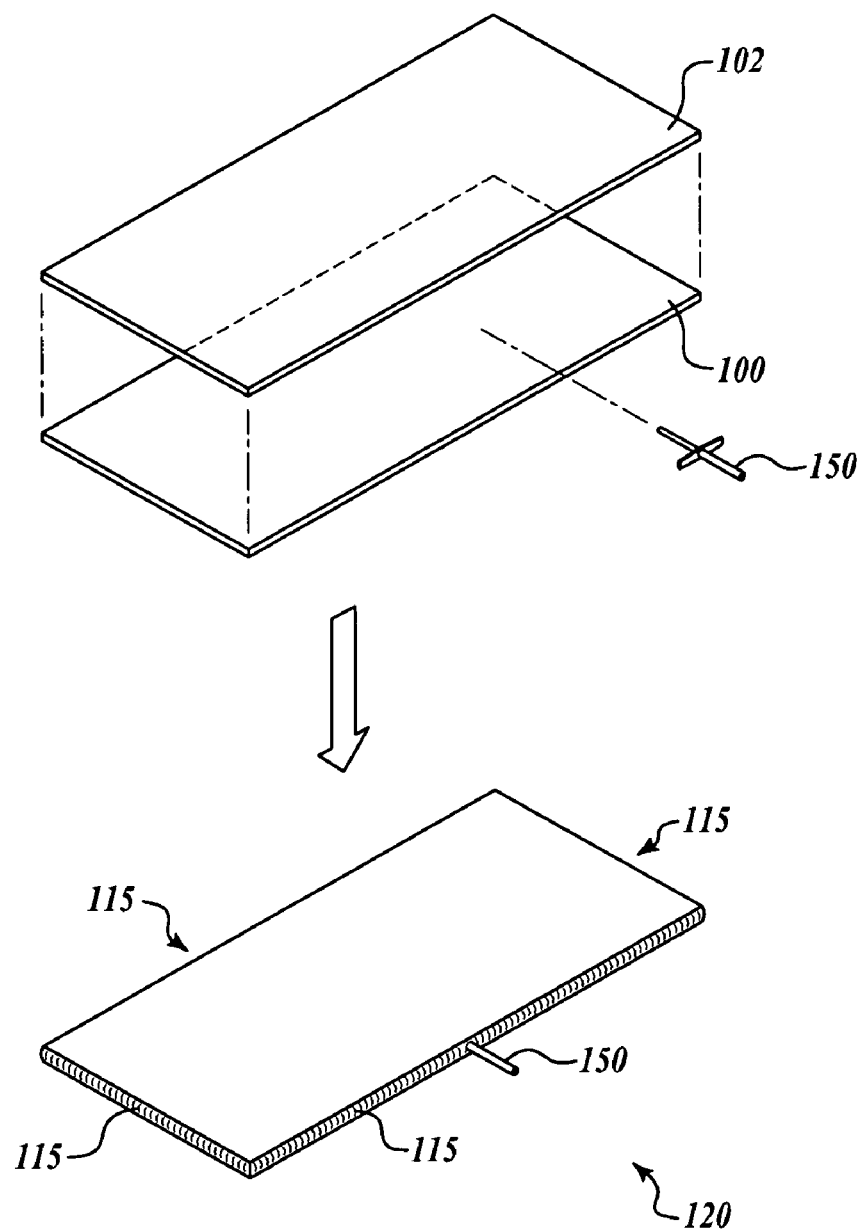
FIG. 1 is a schematic perspective view of two metallic sheets welded to form an example of a pack, for use in accordance with methods of the invention.

The following detailed description is merely illustrative in nature and is not intended to limit the present invention or the application and uses of the invention. Furthermore, there is no intention to be bound by any expressed or implied theory presented in the preceding technical field, background, summary or the following detailed description.

It is known that in the die-forming of superplastic formed diffusion bonded structures, one side of the structure, typically the "smooth" side opposite to any formed structure, often has some surface blemish, known as "mark off". The mark off may appear as a crease or other surface defect that interrupts the smoothness of the surface. This type of defect is not only cosmetically unsightly, but can have other consequences. For example, if the structure is an exterior panel of an aircraft where surface drag may be increased resulting in undesirable effects.

During forming, a pack that typically has two metal sheets to be formed together is placed in a metal forming die. The pack may be sealed; i.e. the edges of the two facing sheets may be bonded together by fusion welding, for example. A gas inlet tube through which pressurizing gas will enter the cavity to form the pack is welded in a gas tight seal to the pack. The pack is then placed in the die for forming under heat and pressure supplied via the inlet tube. It has now been found that by applying a back pressure in the die, outside of a sealed pack being formed, that at least partially counteracts the pressure applied inside the pack, the mark off defect is eliminated or reduced to such an extent that the surface of the formed structure is substantially free of mark off defects.

To implement manufacture of superplastic formed diffusion bonded structures while applying back pressure in the die, the invention also provides a gas inlet tube. The tube is welded to the pack peripheral region to form a tight seal and the tube communicates with the cavity inside the pack. Gas supplied via this tube to the cavity in the sealed pack while back pressure is applied in the die. The gas inlet tube has an outer tube of a material that is weldable, by any suitable process, to the material of the pack. In one embodiment, the outer tube is capable of superplastic deformation and diffusion bonding. The gas inlet tube also has an inner tube of a material impervious to forming conditions of heat and pressure in the die. It may also have wings extending from opposite sides of the outer tube that are adapted for welding to edges of the pack. Thus, for example, a pack made up of two facing sheets of superplastic metal may be sealed by welding peripheral edges together. The gas tube's wings and the outer wall of the gas inlet tube may be welded to the pack to form a tight seal, so that the sealed pack has only one inlet to its inner cavity, namely, via the inlet tube, as discussed in more detail here below. In one embodiment a wing of the gas inlet tube has a hole through which Argon or other inert gas may be purged between the sheets while these are being welded into a pack.

Non-limiting examples of embodiments of the invention are shown in some of the figures that are intended for explanatory purposes. Referring to FIG. 1, a perspective view of a two sheet pack before and after being welded together. The separate sheets 100, 102 are welded together at regions in the vicinity of the perimeters of the sheets in a fusion weld or resistance, or laser, or electron beam welding 115. A gas inlet tube 150 is inserted between the sheets 100, 102 so that the inner tube 152 (see FIG. 3) is in communication with the cavity or space (not shown) formed between the two sheets 100, 102 that form a pack 120.

Figure 2:
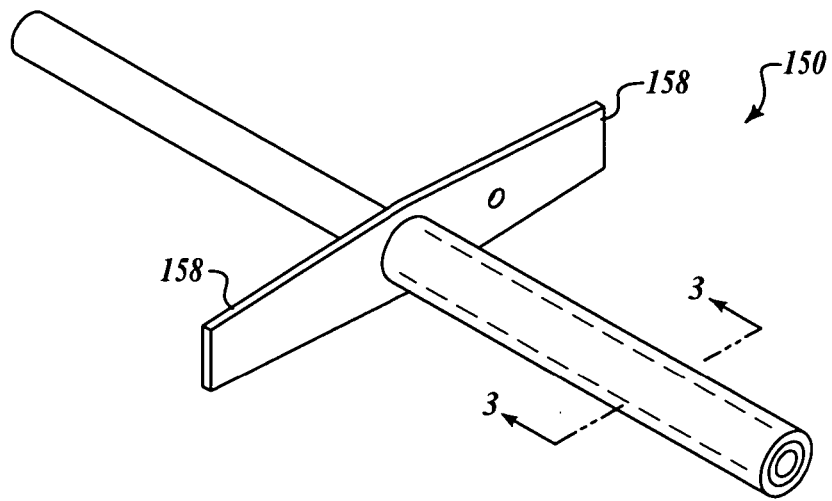
FIG. 2 is side view of an example of a gas inlet tube useful in accordance with methods of the invention.
Figure 3:
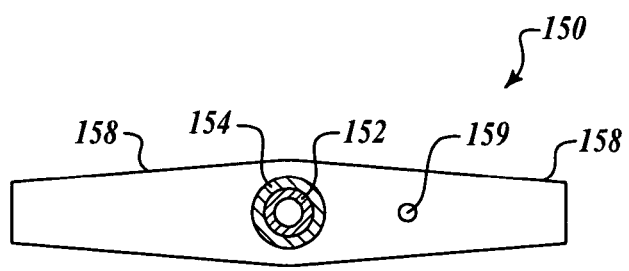
FIG. 3 is a cross sectional view of the tube of FIG. 2 taken at 3-3.

An embodiment of the gas inlet tube 150 of the invention is shown in FIGS. 2 and 3. The tube 150 is made up of an inner tube 152 and an outer tube 154 as shown in FIG. 3, a cross sectional view. In addition, the tube 150 has a pair of opposed outward extending wings 158 that may be of any suitable shape for sealing against the perimeter of the pack 120 in a gas tight seal. The outer tube 154 is of a superplastic material, and may be of the same material as the sheets of the pack 120. For example a material such as Ti-6Al-4V, Ti-3Al-2.5V, and the like. This promotes sealing of the outer tube to the pack 120 by welding for example, to form a gas tight seal. The inner tube 152 is of a material that is substantially unaffected by heat and pressure conditions of forming in the die. Thus, the inner tube may be of stainless steel, such as 304, 310, 316, 321, 347, inconel alloys, and the like. This inner tube 152 will remain open to supply gas to the cavity inside the pack during forming; i.e. the tube will not collapse under pressure and temperature of forming in the die. The wings 158 may be of any suitable material compatible for welding to the pack, and may be of the same material as the sheets of the pack 120. This facilitates welding of the wings to the edge of the pack 120, and promotes a gas tight seal.

Figure 4:
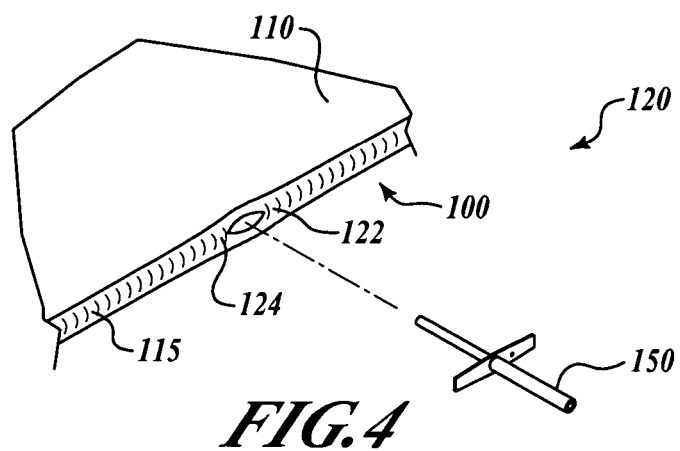
FIG. 4 is schematic in perspective view showing an example of a gas inlet tube juxtaposed for insertion into a receiving non-welded opening in an example of a pack in accordance with an embodiment of the invention.

FIGS. 4 and 5 depict schematically details of sections of the pack 120 around the gas inlet 150. In FIG. 4. the gas inlet tube 150 is juxtaposed for insertion into an unwelded space between sheets 100, 102 of the pack 120. The wings extend to cover edges 122, 124 of the pack 120 to ensure a gas tight seal when welded in place as shown in FIG. 5. In FIG. 5 the outer gas tube 154 is welded in place to the pack 120 and an end portion of the tube 150 extends into the pack for a short distance. In one embodiment, the wings 158 have a through hole 159 into which a small temporary tube 161 (see FIG. 5B) may be inserted and through which Argon or other inert gas may be routed into the space between the sheets 100, 102 while the sheets are being welded into a pack 120. After welding, the temporary tube 161 is removed and the hole 159 is welded shut to seal off the pack, except for the open gas inlet tube 150.

Figure 7:
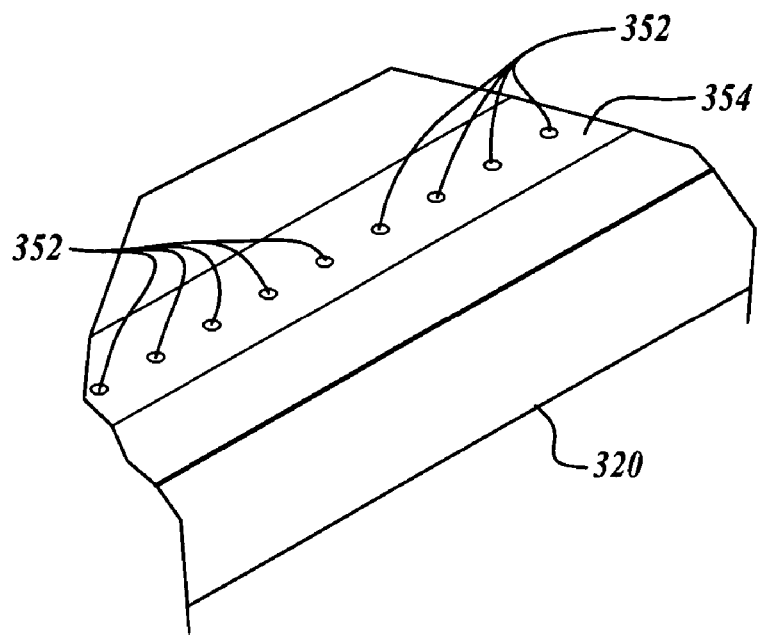
FIG. 7 is an enlarged portion of a die half of FIG. 6 showing an examples of die pressurizing gas inlet ports.

The sealed pack 120 with inlet gas tube 150 in position is now inserted into a metal die for forming. FIG. 6 is a perspective view showing the pack 120 between the die halves 310, 320 of the die 300. One die half is patterned, and in this example, die half 320 is patterned with a pair of parallel troughs 322, 324 into which the stiffeners will be formed on sheet 102 of pack 120. Further, to provide back pressure within the die during forming, the die has a gas inlet 350 that supplies gas to the die interior via a series of internal through bores 352 in the die half 320 (shown in FIG. 7, an enlarged section of the die half 320) that are connected to tubing (not shown) from the gas inlet 352. Accordingly, pressurized gas can be supplied as back pressure to the die. The pressurized gas is in the die but outside the sealed pack 120. Of course, there are a variety of other ways to supply gas to the die to provide back pressure.

Figure 8:
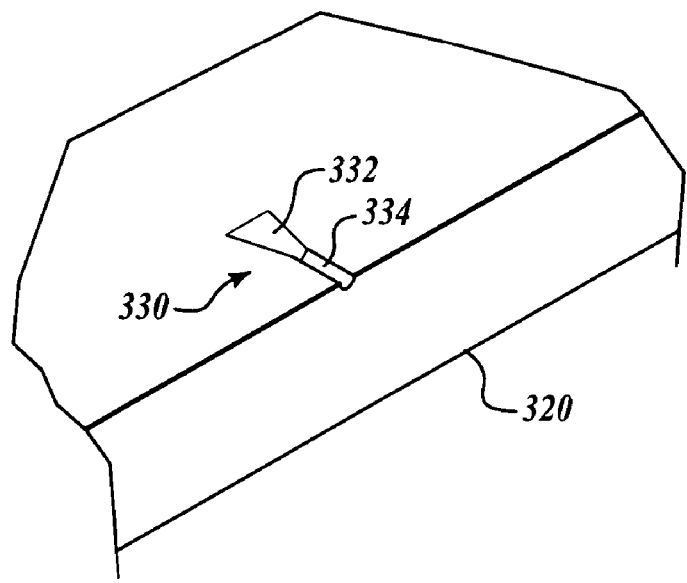
FIG. 8 is an enlarged view of an example of a receiving cavity formed in a die half into which the inlet gas tube attached to the pack fits in a gas tight seal during metal forming in the die, in accordance with an embodiment of the invention.

FIG. 8 shows a section of the die half 320 where the gas inlet tube 150 of the pack will come to rest. The die half 320 has a receiving cavity 330 extending laterally across the die at its peripheral edge that is sized to receive the gas inlet tube 150. In one embodiment shown here, the cavity is funnel-shaped having a conical area 332 with a larger dimension inboard and an apex outboard. The trough 334 of the funnel shaped cavity 330 extends from the apex of the cone 332 to the outer edge of the die half 320.

When the die 300 is closed, the tip of gas inlet 150 extends out from between the die halves and a gas supply may be attached to it to supply pressurized gas. In closing the die, the gas inlet tube 150 is pressed into the receiving cavity 330 to form a gas tight seal. As a result, the die can be pressurized to a first pressure, while the pack 120 is pressurized to a second pressure, higher than the first pressure. The ability to maintain these two pressures permits the production of deep drawn structures substantially free of mark off.

During forming, the back pressure is increased to a pressure of from about 100 to about 300 psi, and the pressure in the internal cavity of the pack 120 (the forming pressure) is in the range from about 200 to about 800 psi. The back pressure must not exceed the forming pressure, and typically the forming pressure is from 100 to about 500 psi greater than the back pressure. Temperatures for superplastic forming vary depending upon specific properties of the sheets: alloy composition and crystalline structure, for example. Typically however, temperatures in the range from about 1400 to about 1750° F. are useful for titanium alloys, but other temperatures may be better suited to certain alloys.

The invention provides methods of superplastic forming and diffusion bonding in a metal forming die that produces structures free of mark off defects due to the application of back pressure. As explained above, this pressure is less than the forming pressure, and may be supplied to the die, around the pack, by any suitable means. The gas inlet tube of the invention may have many variations from the embodiment depicted. It facilitates sealing the pack interior cavity from the back pressure thereby facilitating mark off-free structure production.

In one embodiment of the method of the invention the sealed pack with its attached gas inlet tube is disposed into a die having a patterned surface die half and an opposite die half for superplastic forming and diffusion bonding of the pack. A first pressure is applied within the die around an outside of the pack and a second pressure is applied within the pack. The second pressure exceeds the first pressure by from about 100 to about 500 psi. The die forms the pack under applied heat and pressure by superplastic deformation into a diffusion-bonded structure that has surfaces substantially free of mark off blemishes.

In another embodiment the invention provides a method of superplastic forming in a metal forming die including disposing a welded pack for superplastic forming and diffusion bonding in a die. On the inner surface of the die is a receiving cavity for a gas inlet tube welded to the pack that is in communication with a sealed inner cavity of the pack. The gas inlet tube includes an inner tube of a material substantially impervious to die forming conditions and an outer tube of material capable of being welded to the material of the pack. A first pressure is applied within the die around an outside of the pack and a second pressure is applied within the pack through the gas inlet tube. The second pressure exceeding the first pressure by from about 100 to about 500 psi. The forming of the pack under applied heat and pressure by superplastic deformation into a diffusion-bonded structure provides a structure with surfaces substantially free of mark-off.

The invention further provides a gas inlet tube adapted for use in superplastic forming and diffusion bonding of sheets into a pack. The tube includes two concentric tubes. The outer tube is of a metal compatible for welding to the sheets to form the pack. The inner tube is covered by the outer tube and is of a metal that is impervious to heat and pressure conditions of superplastic formation. The tube may include a wing that extends outward from the tube. The outer tube may be of an alloy such as Ti-6Al-4V. The outer tube and the wing may both be of Ti-6Al-4V or like alloy. A first portion of the tube may be adapted for insertion into a cavity of a pack comprising two metallic sheets so that when tube is welded to the pack and the pack is placed in a die for superplastic formation, the die can be subjected to back pressure while the pack is subject internally to forming pressure seal.

While at least one example embodiment of the method of making mark off free structures using superplastic deformation and diffusion bonding, and of a useful gas inlet device has been presented in the foregoing detailed description, it should be appreciated that a number of variations exist and are within the scope of this invention. It should also be appreciated that the example embodiment or embodiments described herein are not intended to limit the scope, applicability, or configuration of the invention claimed here below in any way. Rather, the foregoing specification will provide those skilled in the art with a convenient road map for implementing the described embodiment or embodiments and variations thereof. These variations are within the scope of the appended claims and legal equivalents of elements of these claims. It should therefore be understood that various changes can be made in the function and arrangement of elements without departing from the scope of the invention as set forth in the appended claims.

The invention claimed is:

1. A method comprising:
   placing a sealed pack including a plurality of sheets into a die, the pack having a gas inlet tube comprising two concentric tubes, the pack further having a wing extending on opposite sides of the gas inlet tube, the wing welded to the sheets, the wing having a hole through which a temporary gas supply tube is inserted and,
   forming the pack by superplastic deformation and diffusion bonding, including supplying gas between the die and the pack to apply a first pressure around an outside of the pack while supplying gas to the inlet tube to apply a second pressure within the pack, the second pressure exceeding the first pressure.

2. The method of claim 1, wherein the two concentric tubes include an outer tube welded to the pack and an inner tube that extends through the outer tube and into the pack.

3. The method of claim 2, wherein the inner tube is made of a material that is substantially impervious to die forming conditions.

4. The method of claim 1, wherein the die includes a receiving cavity with a funnel shape having a funnel mouth inboard and a cylindrical trough extending from an apex of the funnel shape to an outer edge of the die; and wherein placing the pack in the die further includes placing the gas inlet tube in the cavity; and wherein the die is closed to press the gas inlet tube into the receiving cavity.

5. The method of claim 1, further comprising supplying an inert gas via the through hole and between sheets of the pack during welding.

6. The method of claim 4, wherein the outer tube of the gas inlet tube and the wing of the gas inlet tube comprise Ti-6Al-4V.

7. The method of claim 1, wherein the pack is a titanium pack.

* * * * *